United States Patent Office 3,382,983
Patented May 14, 1968

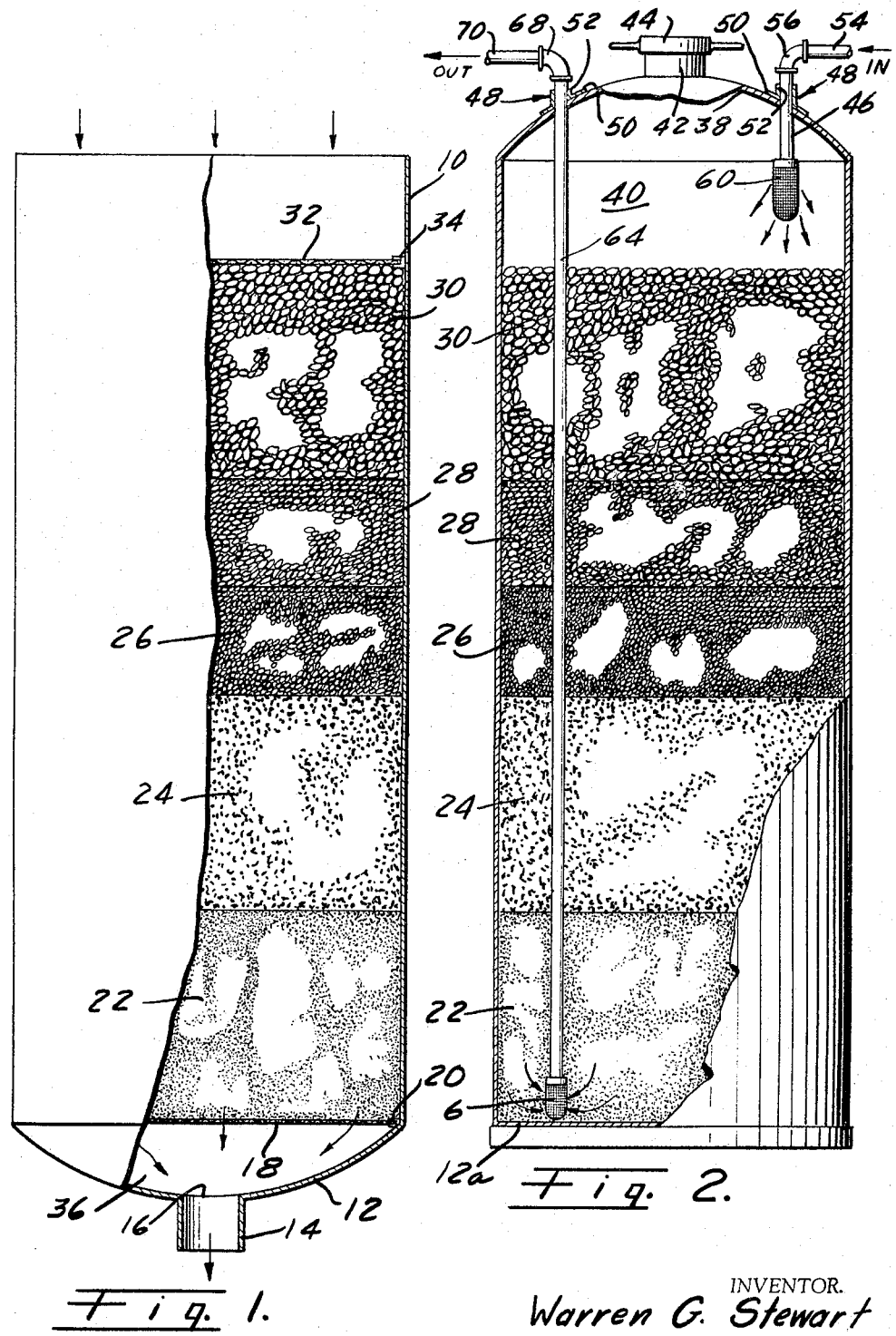

3,382,983
MULTI-LAYERED FILTER APPARATUS
Warren G. Stewart, Las Vegas, Nev., assignor to Dixie Enterprises, Inc., Las Vegas, Nev., a corporation of Nevada
Filed Mar. 16, 1964, Ser. No. 352,255
9 Claims. (Cl. 210—266)

This invention relates generally to means for separating out foreign material in a fluid and relates more particularly to filtering apparatus.

While the invention has particular utility embodied in means for filtering foreign material from liquids, and is shown and described embodied in such means, it is to be understood that its utility is not confined thereto.

More particularly the present invention is shown and described in apparatus or equipment for filtering or removing materials from water containing minerals, sediment and the like.

As is well known, water, except distilled water, contains various minerals and in many cases sediment impurities and the like which may be termed or considered herein as foreign materials.

As is well known various problems and difficulties are encountered in providing filtering equipment that will remove minerals, sediment and the like from water. Some of the problems and difficulties are that filtering equipment for such purposes is usually expensive and soon its ability to effectively filter the water is lost.

It is therefore an object of the present invention to provide filtering apparatus or equipment that solves these problems and difficulties.

Another object of the invention is to provide apparatus or equipment of this character that is relatively inexpensive to manufacture.

Still another object of the invention is to provide apparatus or equipment of this character that will be at substantially maximum effectiveness for removing minerals, impurities, sediment and the like for much longer periods of time than other filters of which I am aware. That is, the present invention has an effective life many times longer than such other filters.

A further object of the invention is to provide apparatus or equipment of this character that has been found to remove substantially all material that makes water hard so that the water treated or passed through this equipment has no appreciable mineral content, the water having, by actual tests, zero hardness.

A still further object of the invention is to provide means of this character that is relatively simple in construction.

Another object of the invention is to provide means of this character that is highly effective in the operation of removing minerals, impurities, sediment and the like from water.

Still another object of the invention is to provide means of this character that is rapid and reliable in its functioning operation.

The characteristics and advantages of the invention are further sufficiently referred to in connection with the following detailed description of the accompanying drawings, which represent certain embodiments. After considering these examples, skilled persons will understand that variations may be made without departing from the principles disclosed and I contemplate the use of any structures, composition of filtering materials, arrangements, or modes of operation that are properly within the scope of the appended claims.

Referring to the drawings, which are for illustrative purposes only:

FIG. 1 is a side view of one type of filtering equipment embodying the present invention, portions being broken away to show the interior construction; and FIG. 2 is a similar view showing an alternative arrangement.

Referring more particularly to FIG. 1, there is shown a container 10 open at the upper end and closed at the lower end by a bottom wall 12 from which depends an outlet conduit 14 communicating with the interior of the container by means of an outlet port or opening 16 in the wall 12. The wall 12 is concavo-convex with the concave side at the top to insure drainage from the container.

In the lower end of the container there is a screen 18 of suitable wire mesh or the like peripherally reinforced by a reinforcing member 20 that is U-shape in cross section and in which the marginal portions of the screen 18 is disposed and secured by clamping, soldering or the like. The reinforcing member 20 rests on the peripheral portion of the bottom wall 12 at its junction with the vertical wall of the container.

Screen 18 is of relatively fine mesh and above said screen is water softening material 22 which may be of any well known type presently on the market, such as zeolite, for example, in the form now used in water softeners.

Above the water softening material 22 are layers of granular filtering material of progressively coarser size, the composition of this filtering material being given hereinafter. The filtering material directly above the water softening material is indicated at 24 and fills approximately one-fourth of that portion of the container having filtering material. The material 24 is of 40-mesh. The layer above the filtering material 24 is indicated at 26 and fills approximately one-eighth of that portion of the container having filtering material, filtering material 26 being of 30-mesh.

Above the filtering material 26 is filtering material of 20-mesh, indicated at 28, and fills approximately one-eighth of the container portion having filtering material. Above the filtering material 28 is filtering material 30 of 10-mesh and filling approximately one-fourth of that portion of the container having filtering material.

The filtering materials 24, 26, 28 and 30 are well packed in the container and at the top of the layer of filtering materials 30 is a screen 32 of relatively coarse mesh, said screen having a peripheral reinforcing element or member 34 that is channel-shape in cross section and in which the peripheral portion of said screen 32 is secured, as by clamping, soldering, or the like.

The filtering material in the layers 24, 26, 28 and 30 comprises granite, nickel, manganese, magnesium, titanium, iron, aluminum and silicon. These materials are in oxide form and when referred to herein it is to be understood that it is the oxides of said materials that are meant.

The amounts of these various elements are as follows:

| | Percent |
|---|---|
| Granite | 15–20 |
| Nickel | ½–1 |
| Manganese | 1–2 |
| Magnesium | 2–5 |
| Titanium | 1–3 |
| Iron (magnetite, for example) | 10–20 |
| Aluminum (bauxite, for example) | 10–15 |
| Silicon | 20–30 |

These materials are mixed and ground to the proper fineness for each layer to be used in the filter container. For example, the material in the layer 24 is ground to a 40-mesh size. The materials in the other layers are ground in accordance with the fineness given above for such layers. By mesh it is meant that the particles or granules are of about the size of the openings in screens of the mesh specified.

By having the coarse material at the top of the filter the larger solids in the water are trapped and each layer will progressively remove smaller particles of the foreign material and the like in the water, so that all of the coarse pieces will be removed before the water reaches the fine filtering agent or material.

It is believed that the reason the present invention functions so effectively is that the water is filtered through the various layers 24, 26, 28 and 30 of the filtering material before going into the water softening layer 22 of zeolite or the like.

By having the various elements in the filtering material, it has been found that a more effective removal of minerals and other foreign materials and impurities are removed by the different elements and also it appears that by having these various elements mixed and functioning together there is a chemical interaction or catalytic action in the mixture.

It has also been found that the silicon removes chlorides in the water, the granite removes bicarbonates, the iron removes sulphates and iron, the titanium removes sodium and the manganese and magnesium remove calcium and other solids.

In the apparatus or device shown in FIG. 1, water is poured into the top through the open upper end and passes through the various layers of filtering material and through the water softening chemicals in the layer 22 and thence through the screen 18 and chamber 36 beneath said screen and thence through the port or opening 16 and into the outlet conduit 14. In other words, this filter is of the gravity type.

Referring to FIG. 2, there is shown a pressure type of filtering apparatus wherein the container 10 has a bottom wall 12a and has a top wall 38 that is dome shaped and defines a chamber 40 in the upper end of the container. The top wall has an inlet pipe 42 which is closed by a suitable cap 44 which is screwed onto the upper free end of the pipe 42 or otherwise secured thereto and a seal, not shown, may be provided to insure against escape of fluid from the pipe 42. The pipe 42 provides access to the interior of the container 10 for filling same with the filtering material. Of course, the entire top wall may be arranged for removal from the container 10.

An inlet pipe 46 for water extends through a fixture 48 having a flange 50 for attachment to the top wall 38 by brazing or other suitable means. There is a tubular upstanding portion 52 of said fixture through which the pipe 46 extends and said pipe may be secured in the fixture part 48 by brazing or other suitable means. The pipe 46 is connected to the source of water to be filtered by a pipe 54 and an elbow 56. At the lower end of the pipe 46 which terminates within the chamber 40 is a filter 60 of suitable wire screen or other material.

The outlet of the filter comprises a pipe 64 which extends vertically in the container and has its lower end terminating adjacent the bottom wall 12a. A filter 6 is operably attached to the lower end of the pipe 64, said filter being disposed within the layer of water softening material 22 adjacent the bottom of said layer.

The upper end of pipe 64 is connected by an elbow 68 to a conduit or pipe 70 for conducting the filtered water to a point of use or to a reservoir or container, or the like.

The materials in the container of the apparatus shown in FIG. 2 are the same as those in the arrangement shown in FIG. 1 and the thickness of the various layers is the same.

It is to be understood, of course, that the various layers may vary in thickness from the thicknesses shown in FIGS. 1 and 2.

The water to be filtered in the filtering apparatus shown in FIG. 2 is supplied under pressure by any suitable means that will cause the water to enter the upper end of the container and be discharged from the upper end of through the outlet pipe 64, elbow 68 and conduit or pipe 70.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of example, and I do not wish to be restricted to the specific forms shown or uses mentioned except as defined in the accompanying claims, wherein various portions have been separated for clarity of reading and not for emphasis.

I claim:
1. A filter for water comprising:
(A) a cylindrical container open at the upper end and closed at the lower end by a lower end wall bulging downwardly and having an outlet conduit communicating with the lower end of said container by means of a port in said bottom wall;
(B) a screen normal to the axis of said container and positioned adjacent the lower end of said container, said screen being of relatively fine mesh;
(C) water softening material in permeable form forming a layer above said screen;
(D) a layer of filtering material of approximately 40-mesh above said water softening material in permeable form and extending in thickness approximately ¼ of that portion of the container containing filtering material;
(E) a layer of filtering material above said 40-mesh material of approximately 30-mesh and of a thickness approximately ⅛ of that portion of the container having filtering material;
(F) a layer of filtering material above the last mentioned layer of filtering material, said layer of material being of approximately 20-mesh and extending in thickness of approximately ⅛ of that portion of the container having filtering material;
(G) a top layer of filtering material of approximately 10-mesh, said top layer being of a thickness approximately ¼ the extent of the portion of the container having filtering material, said filtering material comprising a mixture of 15 to 20 percent of granite, ½ to 1 percent of nickel, 1 to 2 percent manganese, 2 to 5 percent magnesium, 1 to 3 percent titanium, 10 to 20 percent of iron, 10 to 15 percent of aluminum and 20 to 30 percent of silicon;
(H) and a top screen of relatively coarse mesh and disposed on the top of the top layer of filtering material.

2. A filter for water comprising:
(A) a container open at the upper end and closed at the lower end by a lower end wall bulging downwardly and having an outlet conduit communicating with the lower end of said container by means of a port in said bottom wall;
(B) a screen normal to the axis of said container and positioned at the lower end of said container, said screen being of relatively fine mesh;
(C) water softening material in permeable form forming a layer above said screen;
(D) a layer of filtering material of approximately 40-mesh above said water softening material in permeable form;
(E) a layer of filtering material above said 40-mesh material and of approximately 30-mesh;
(F) a layer of filtering material above the last mentioned layer of filtering material, said layer of material being of approximately 20-mesh;
(G) a top layer of filtering material of approximately 10-mesh, said filtering material comprising a mixture of 15 to 20 percent of granite, 1 to 2 percent manganese, 2 to 5 percent magnesium, 1 to 3 percent titanium, 10 to 20 percent iron, and 20 to 30 percent silicon, these materials being in oxide form.

3. A filter for water, comprising:

(A) a container opened at the upper end and closed at the lower end by a lower end wall bulging downwardly and having an outlet conduit communicating with the lower end of said container by means of a port in said bottom wall;
(B) a screen normal to the axis of said container and positioned at the lower end of said container, said screen being of relatively fine mesh;
(C) water softening material in permeable form forming a layer above said screen;
(D) a first layer of fine filtering material above said water softening material;
(E) a second layer of coarser filtering material above said first layer of filtering material;
(F) a third layer of filtering material coarser than said second layer of filtering material;
(G) and a top layer of still coarser filtering material, said filtering material being of such character as to remove various foreign materials in the water including chlorides, bicarbonates, sulfates, iron, sodium, calcium, and other solids.

4. A filter for water, comprising:
(A) a container open at the upper end and closed at the lower end by a lower end wall and having an outlet therein;
(B) water softening material in permeable form forming a layer adjacent said lower end;
(C) a first layer of fine filtering material above said water softening material;
(D) a second layer of coarser filtering material above said first layer of filtering material;
(E) a third layer of filtering material coarser than said said second layer of filtering material on said second layer;
(F) and a top layer of still coarser filtering material, said filtering material being of such character as to remove various foreign materials in the water including chlorides, bicarbonates, sulfates, iron, sodium, calcium, and other solids.

5. A mixture of material for filtering liquids, said mixture comprising the following ingredients in oxide form: granite; nickel; manganese; magnesium; titanium; iron; aluminum; and silicon.

6. A mixture of granular filtering material, comprising the following ingredients in oxide form:

|  | Percent |
|---|---|
| (A) Granite | 15–20 |
| (B) Nickel | ½–1 |
| (C) Manganese | 1–2 |
| (D) Magnesium | 2–5 |
| (E) Titanium | 1–3 |
| (F) Iron | 10–20 |
| (G) Aluminum | 10–15 |
| (H) Silicon | 20–30 |

7. A mixture of granular filtering material, comprising the following ingredients in oxide form:

|  | Percent |
|---|---|
| (A) Granite | 15–20 |
| (B) Nickel | ½–1 |
| (C) Manganese | 1–2 |
| (D) Magnesium | 2–5 |
| (E) Titanium | 1–2 |
| (F) Aluminum | 10–15 |
| (G) Silicon | 20–30 |

8. A mixture of granular filtering material, comprising the following ingredients in oxide form:

|  | Percent |
|---|---|
| (A) Granite | 15–20 |
| (B) Nickel | ½–1 |
| (C) Manganese | 1–2 |
| (D) Magnesium | 2–5 |
| (E) Iron | 10–20 |
| (F) Aluminum | 10–15 |
| (G) Silicon | 20–30 |

9. A mixture of granular filtering material, comprising the following ingredients in oxide form:

|  | Percent |
|---|---|
| (A) Granite | 15–20 |
| (B) Nickel | ½–1 |
| (C) Manganese | 1–2 |
| (D) Magnesium | 2–5 |
| (E) Aluminum | 10–15 |
| (F) Silicon | 20–30 |

References Cited

UNITED STATES PATENTS 2,670,328    2/1954    Webb    210—190 X
2,723,761    11/1955    Van Der Made et al.    210—190 X REUBEN FRIEDMAN, *Primary Examiner.*

MORRIS O. WOLK, *Examiner.*

E. G. WHITBY, *Assistant Examiner.*